United States Patent [19]

Moroto et al.

[11] Patent Number: 4,854,195
[45] Date of Patent: Aug. 8, 1989

[54] HYDRAULIC CONTROL SYSTEM FOR VEHICULAR AUTOMATIC TRANSMISSION WITH TWO ACCUMULATOR CONTROL VALUES TO VARY BACK PRESSURE TO ACCUMULATOR TO FOLLOW THE CHANGE IN ENGINE TORQUE

[75] Inventors: Shuzo Moroto, Handa; Koji Sumiya, Nishio; Yoshikazu Sakaguchi, Anjo; Seitoku Kubo, Toyota; Yutaka Taga, Aichi, all of Japan

[73] Assignee: Aisin-Warner Limited, Japan

[21] Appl. No.: 759,828

[22] Filed: Jul. 29, 1985

[30] Foreign Application Priority Data

Jul. 31, 1984 [JP] Japan ................. 59-161911

[51] Int. Cl.⁴ .......................... B60K 41/16
[52] U.S. Cl. ...................... 74/867; 74/868
[58] Field of Search .......... 74/867, 868, 869

[56] References Cited
U.S. PATENT DOCUMENTS 2,809,536 10/1957 O'Malley ................. 74/868
2,832,231 4/1958 Edsall ..................... 74/868
2,875,634 3/1959 Gelenius et al. ........ 74/868
4,428,258 1/1984 Kubo et al. .............. 74/867

FOREIGN PATENT DOCUMENTS 2015093 9/1979 United Kingdom ........ 74/867

Primary Examiner—Allan D. Herrmann
Assistant Examiner—D. Wright
Attorney, Agent, or Firm—Lorusso & Loud

[57] ABSTRACT

Described herein is a hydraulic control system for vehicular automatic transmission, including an accumulator back pressure control circuit which is provided between a line pressure conduit and a back pressure supply conduit, and comprises a first accumulator control valve for dropping the line pressure according to the throttle opening, and a second accumulator control valve receiving an input pressure commensurate with the throttle opening and dropping the output pressure of the first accumulator control valve according to the throttle opening to apply to the piston of the accumulator a back pressure varying in corresponding to the engine output shaft torque.

1 Claim, 4 Drawing Sheets

HYDRAULIC CONTROL SYSTEM FOR VEHICULAR AUTOMATIC TRANSMISSION WITH TWO ACCUMULATOR CONTROL VALUES TO VARY BACK PRESSURE TO ACCUMULATOR TO FOLLOW THE CHANGE IN ENGINE TORQUE

BACKGROUND OF THE INVENTION (i) Field of the Invention

This invention relates to a hydraulic control system for vehicular automatic transmission, which is provided with an accumulator or accumulators.

(ii) Description of the Prior Art

Hydraulic control systems of vehicular automatic transmissions are usually provided with accumulators in oil conduits which supply operating oil to and from hydraulic servos of friction coupling elements of the transmission, thereby to adjust the varying characteristics of transmission torque capacity on engagement and release of the friction coupling elements for preventing shift shocks. The accumulator of this sort is usually constituted by a cylinder and a spring-loaded piston fitted in the cylinder and applied with a line pressure or a back pressure commensurate with the vehicle speed to produce a varying pressure with characteristics corresponding to the vehicle speed.

In this connection, the back pressure which is applied to the accumulator piston governs the characteristics of the transmission torque capacity of the friction coupling elements, so that it is desirable to vary the back pressure correspondingly to the torque of the engine output shaft.

SUMMARY OF THE INVENTION

It is an object of the present invention to provide a hydraulic control system for vehicular automatic transmission, including an accumulator back pressure control circuit for varying the back pressure on the piston of the accumulator approximately in correspondence to variations in the engine output shaft torque.

According to the invention, the foregoing objective is achieved by the provision of a hydraulic control system for vehicular automatic transmission, the hydraulic control system including an accumulator control circuit provided between a line pressure conduit and a back pressure supply conduit to an accumulator and comprising a first accumulator control valve for dropping the line pressure according to the throttle opening; and a second accumulator control valve receiving an input pressure commensurate with the throttle opening to drop the output pressure of the first accumulator control valve according to the throttle opening, thereby applying to the piston of the accumulator a back pressure corresponding to the engine output shaft torque.

As the back pressure of the accumulator piston is varied approximately in correspondence to variations in the engine output shaft torque, it becomes possible to control the pressure rise characteristics of the hydraulic servos of friction coupling elements of an automatic transmission in an optimum manner over a wide range of vehicle operating conditions thereby to suppress the shift shocks.

The above and other objects, features and advantages of the invention will become apparent from the following description and the appended claims, taken in conjunction with the accompanying drawings which show by way of example a preferred embodiment of the invention.

DESCRIPTION OF PREFERRED EMBODIMENTS

Figure 1:
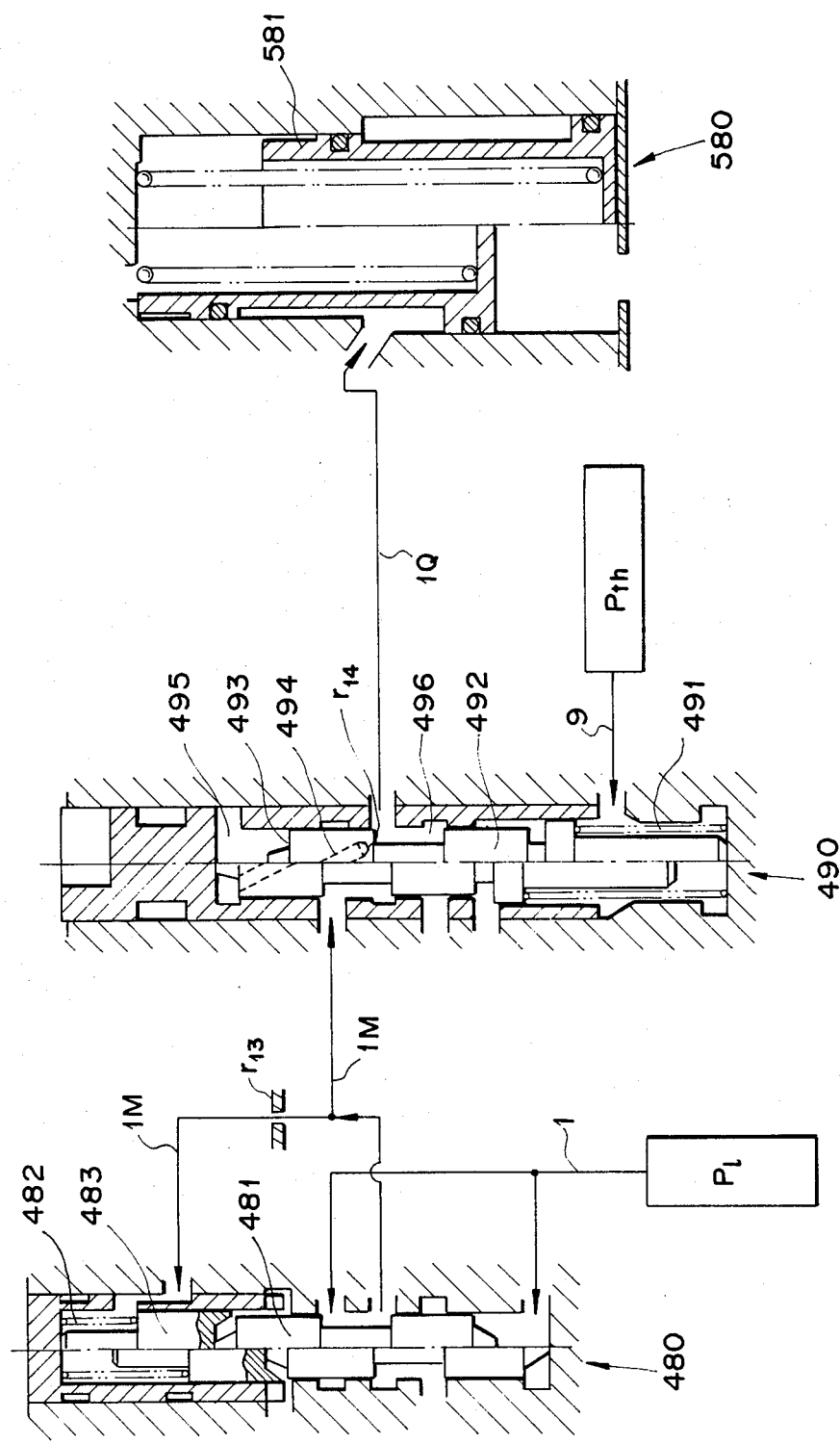
FIG. 1 is a layout of a hydraulic control system for vehicular automatic transmission, according to the invention.
Figure 2:
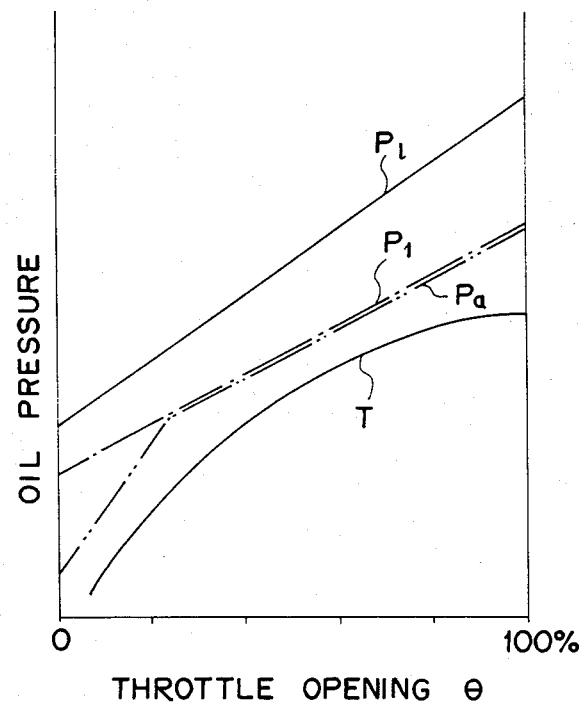
FIG. 2 is a diagram of pressure variation characteristics.

As shown in FIG. 1, a hydraulic control system according to the present invention is provided between a conduit 1 carrying a line pressure P1 or an oil pressure varying mainly according to the vehicle speed and a back pressure supply conduit 1Q leading to an accumulator, and includes: a first accumulator control valve 480 which serves to drop the oil pressure P1 at a constant rate over the entire range of throttle opening 0 as indicated by the first accumulator control pressure P1 in FIG. 2; and a second accumulator control valve 490 which is serves to adjust the accumulator back pressure, receiving the throttle pressure Pth as its input and lowering the output pressure Pa of the first accumulator control valve 480 in proportion to the throttle pressure Pth when the angle of throttle opening Q is below a predetermined value Q1. A back pressure with characteristics approximating the variations in engine output shaft torque T is applied to a piston 581 of an accumulator 580 to control the transmission torque capacity of the friction coupling elements according to the output shaft torque of the engine.

As shown in the diagram of FIG. 2, the first accumulator control pressure P1 is generated by the first accumulator control valve 480 by dropping the line pressure P1 at a constant rae, and it is further dropped by the second accumulator control valve 490 in proportion to the throttle valve when the extent of throttle opening 0 is smaller than 25%, for example, to produce the second accumulator back pressure Pa of the characteristics akin to the engine output shaft torque T. Accordingly, it becomes possible to obtain more suitable characteristics of accumulator pressure adjustment according to the operating condition of the vehicle as compared with the conventional control systems in which the first accumulator control pressure P1 is applied as a piston back pressure, as a result enhancing the effect of preventing shift shocks.

Figure 3:
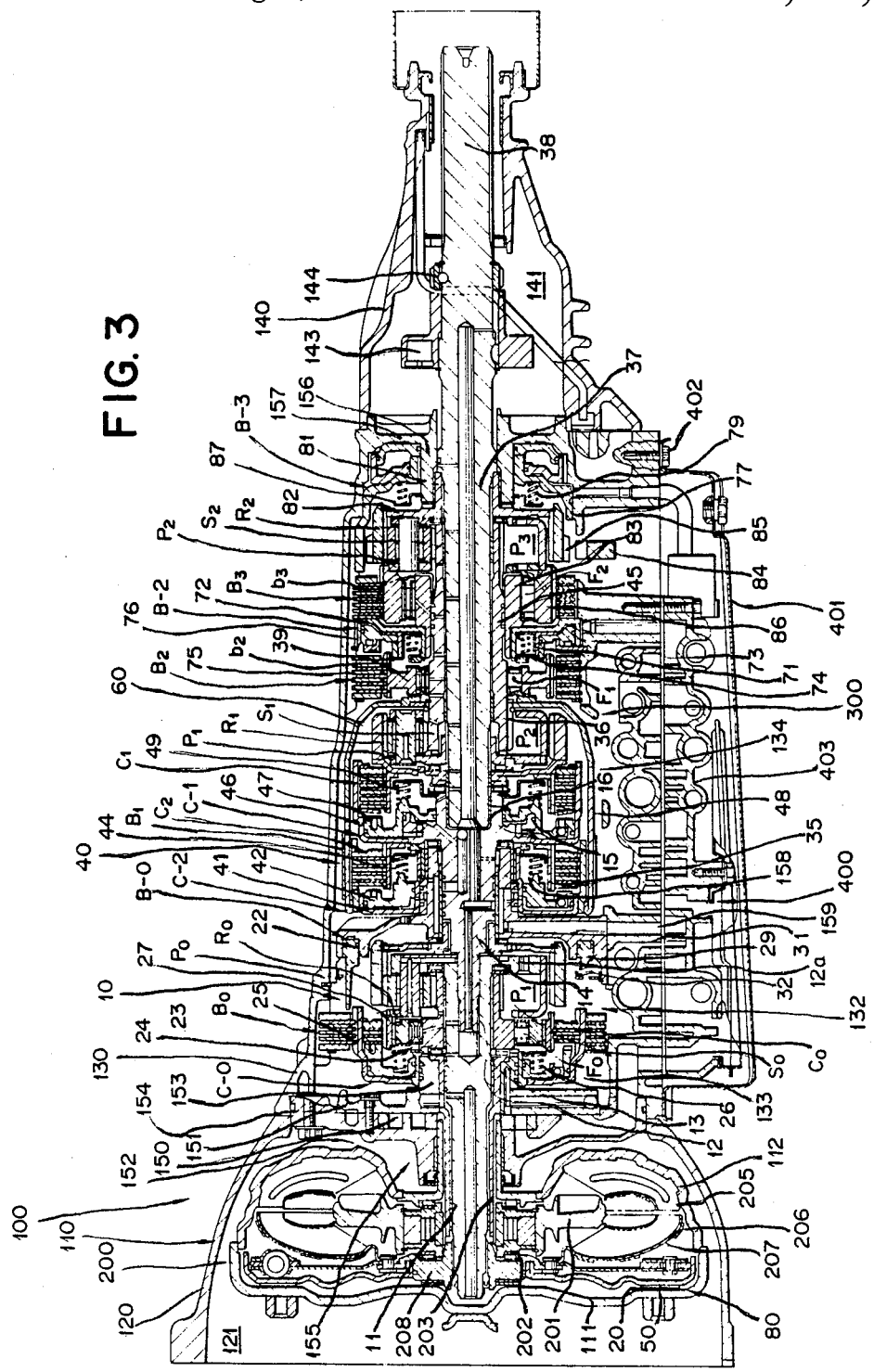
FIG. 3 is a diagrammatic sectional view of a vehicular automatic transmission.
Figure 4:
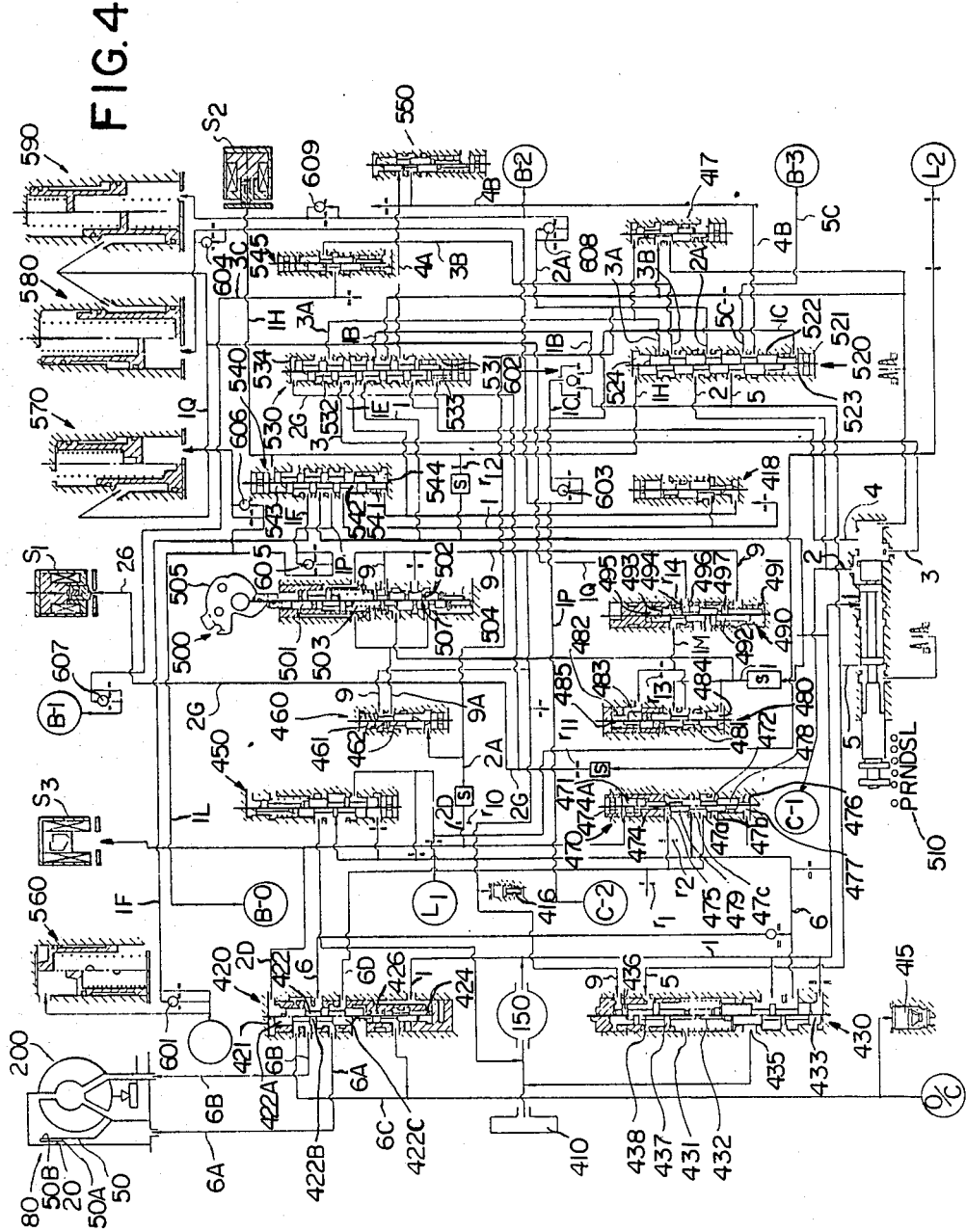
FIG. 4 is a hydraulic circuit diagram of a vehicular automatic transmission and its hydraulic control system incorporating the present invention.

Illustrated in FIGS. 3 and 4 is a hydraulic control system for vehicular automatic transmission, incorporating the accumulator back pressure control mechanism according to the invention, wherein the automatic transmission 100 includes a fluid type coupling (a torque converter in this case) 200, a transmission 300, and a hydraulic control system 400.

The transmission 300 includes: an overdrive planetary gear transmission 10 having a first planetary gear set p1 and a multiple disk clutch C0, a multiple disk brake B0 and a one-way clutch F0 operated by hydraulic servo cylinders; and an underdrive planetary gear transmission 40 with three forward and one reverse speed ranges, having a second planetary gear set p2, a third planetary gear set p3, and two multiple disk clutches C1 and C2, one belt brake B1, two multiple disk brakes B2 and B3 and two one-way clutches F1 and F2.

The case 110 of the automatic transmission 100 includes a torque converter housing 120 accommodating the torque converter 200, a transmission case 130 accommodating the overdrive planetary gear transmission 10 and underdrive planetary gear transmission 40 in series; and an extension housing 140 closing the rear side of the automatic transmission 100. These torque converter housing 120, transmission case 130 and extension housing 140 are fastened together in coaxial relation with each other.

The torque converter 200 is received in a torque converter room 121 which is open on the front side (on the side of the engine), and includes: a front cover 111 coupled with the output shaft of the engine, a rear cover 112 in the form of an annular plate welded at its outer periphery to the front cover 111, pump impeller 205 provided around the inner wall on the inner peripheral surface of the rear cover 112, turbine runner 206 located opposingly to the pump impeller 205, a turbine shell 207 retaining the turbine runner 206 in position, a stator 201 supported on a fixed shaft 203 through a one-way clutch 202, a clutch disk 50 in the form of an annular plate coupled with a friction surface 20 provided on the inner surface of the front cover 111 and a turbine hub 208, and a lock-up (direct coupling) clutch 80 for coupling the front cover 111 and the turbine hub 208. Provided between the torque converter room 121 and a cylindrical transmission room 132 of the transmission case 130, which extends continuously on the rear side of the torque converter room 121, is an internal gear type oil pump 150 having an annular oil pump casing 151 with a forwardly projecting cylindrical portion 152 and being fitted in and fastened to the front end face of the transmission case 130. An oil pump cover 154 is fastened to the rear side of the oil pump casing 151, with a rearwardly projecting cylindrical front support 153 in coaxial relation with the afore-mentioned cylindrical portion 152. The oil pump casing 151 and the oil pump cover 154 form an oil pump housing 155, serving as a partition wall between the torque converter room 121 and the transmission room 132 and also as a front support wall for the transmission 300. Fitted in an intermediate position in the transmission room 132 of the transmission case 130 is an intermediate support wall 159 with a rearwardly projecting cylindrical center support 158, which is formed separately by casting. In a rear portion of the transmission case 130, a rear support wall 157 with a forwardly projecting cylindrical rear support 156 is provided, which is formed integrally with the transmission case 130 by casting. The oil pump housing (the front support wall or partition wall) 155 and the rear support wall 157 form the transmission room 132 for receiving the transmission 300, defining an output shaft room 141 of the transmission between the rear support wall 157 and the extension housing 140. In the output shaft room 141, an electronic control type sensor rotor 143 and a speedometer drive gear 144 are fixedly mounted on the output shaft, and, in its rear end portion, a sleeve yoke which is not shown is coupled with a propeller shaft (not shown) coaxially with the front support 153.

On the inner side of the front support 153, an input shaft 11 of the transmission which serves also as an output shaft of the torque converter 200 is rotatably mounted in the fixed shaft 203. The input shaft 11 is provided with a flange portion 12a rearward of the front support 153 and a rear end portion 12 of a larger diameter with a rearwardly opened center hole 13. An intermediate transmission shaft 14 is rotatably mounted rearward of the input shaft 11 coaxially and in series with the latter. The intermediate transmission shaft 14 has its fore end inserted in the center hole 13 rotatably in sliding contact with the inner peripheral wall of the center hole 13 through a bush, and is provided with a rearwardly opened center hole 16 along the axis of its rear end portion 15 of a larger diameter. An output shaft 36 is rotatably mounted behind the intermediate transmission shaft 14 coaxially and in series with the latter. The output shaft 36 has its fore end inserted in the center hole 16 of the intermediate transmission shaft 14 in sliding contact with the inner wall of the center hole 16 through a bush. The output shaft 36 is splined in its center portion 37 to a flange plate 82 with a shaft portion 81 in meshing engagement with the ring gear R2 of the third planetary gear set p3, and in its rear portion 38 to the afore-mentioned sleeve yoke.

In the overdrive room 133, the first planetary gear set p1 is mounted behind the input shaft 11, including a ring gear R0 coupled with the intermediate transmission shaft 14 through a flange plate 22, a planetary carrier P0 coupled with a flange portion 12a of the input shaft 11, and a sun gear S0 formed on an inner race shaft 23. A forwardly opened first hydraulic servo drum 24 is fixedly mounted on the inner race shaft 23 in front of the first planetary gear set p1, and an annular piston 25 is fitted between the outer peripheral wall of the drum and the inner race shaft 23 to form a hydraulic servo C-0 for the clutch C0, mounting return springs 26 on the side of the inner race shaft 23 and the clutch C0 on the inner side of the outer peripheral wall and being coupled with the planetary carrier P0 through the clutch C0. Mounted on the inner periphery of the first hydraulic servo drum 24 is a one-way clutch F0 which has the inner race shaft 23 as its inner race, and, on its outer periphery, the clutch C0 and brake B0 are provided between outer race 27 and transmission case 130. A piston 29 is fitted in an outer cylinder 31 of the intermediate support wall 159 which is mounted on the rear side of the brake B0 to form a hydraulic servo B-0 therefor, locating return springs 31 at the fore end of the outer cylinder 31.

In the underdrive room 134, a second hydraulic servo drum 41 is rotatably fitted on the center support 158 in a front portion of the room, and a piston 42 is fitted between the inner and outer peripheral walls of the drum to form a hydraulic servo C-2 for the clutch C2, mounting return springs 44 on the side of the inner peripheral wall and the clutch C2 on the inner side of the outer peripheral wall. Behind the second hydraulic servo drum 41, a rearwardly opened third hydraulic servo drum 46 with an annular clutch hub 35 welded on the front side is fixedly mounted on a rear end portion 15 of the intermediate transmission shaft 14, and an annular piston 47 is fitted between the rear end portion 15 and the outer peripheral wall of the drum to form a hydraulic servo C-1 for the clutch C1, mounting return springs on the side of the inner periphery thereof and the clutch C2 on the outer periphery of the annular clutch hub 35. The second and third hydraulic servo drums 41 and 46 are coupled with each other through the clutch C2. Provided behind the third hydraulic servo drum 46 is the second planetary gear set p2, having a ring gear R1 coupled with the third hydraulic servo drum 46 through the annular clutch hub 48 and clutch C1, a planetary carrier P1 splined with a fore end portion of the output shaft 36, and a sun gear S1 formed integrally with the sun gear shaft 45. A connecting drum 60 which is so shaped as to cover the second and third hydraulic servo drums 41 and 46 and the second planetary gear set p2 in a minimum space is fixed on the outer periphery of the second hydraulic servo drum 41 and has its rear end coupled with the sun gear 45 behind the second planetary gear set p2, mounting a belt brake B1 on the outer periphery thereof.

Spline 75 which is formed on the inner side of the transmission case 130 behind the brake B2 is in engagement with brake disks b2 of the brake B2, outer spline 76 of a fourth hydraulic servo drum 72 and brake disks b3 of the brake B3 which are fitted from the front side, and on its rear side, a piston 77 is fitted in an annular hole between the rear support 156 of the rear support wall 157 and the transmission case 130 to form a hydraulic servo B-3 for the brake B3. Return springs 79 of the hydraulic servo B-3 are supported by a retainer 87 which is mounted at the fore end of the rear support 156. Located on the inner side of the brake B2 is a one-way clutch F1 which has the sun gear shaft 45 as its inner race, with its outer race 39 connected to the brake B2, and a one-way clutch F2 which has its inner race 83 splined with the fourth hydraulic servo drum 72 is mounted behind the one-way clutch F1. The third planetary gear set p3 has a sun gear S2 formed integrally with the sun gear shaft 45, a planetary carrier P2 coupled with the outer race of the one-way clutch F2 on the front side and with the brake B3, and a ring gear R2 provided with a parking gear 85 around the circumference thereof and coupled with an intermediate portion 37 of the output shaft 36. The parking gear 85 is brought into meshed engagement with a parking pawl 84 to fix the output shaft 36 when the shiftlever of the automatic transmission is set in "P" (parking) position.

A forwardly opened annular fourth hydraulic servo drum 72 is mounted behind the connecting drum 60 outward of the second planetary gear set p2. A press-formed intermediate cylinder 71 is projected from a predetermined position in the fourth hydraulic servo drum 72 and joined to the latter by welding to prevent leaks of oil pressure from the hydraulic servo. An annular piston 73 is fitted between the fourth hydraulic servo drum 72 and the intermediate cylinder 71 to form a hydraulic servo B-2 for the brake 2, mounting its return spring between the inner peripheral wall of the fourth hydraulic servo drum 72 and the intermediate cylinder 71 and locating the brake B2 on the inner side of the outer peripheral wall. The intermediate cylinder 71 defines an area of an optimum diameter for the piston 73.

The transmission 300 engages or releases the respective clutches and brakes by the oil pressure which is selectively supplied to the hydraulic servos of the friction coupling elements according to the vehicle speed, throttle opening or other operating conditions of the vehicle by the hydraulic control system 400 provided in a valve casing 403 in an oil pan 401 which is fastened to the lower side of the transmission case 130 by bolts 402 thereby effecting shifts to and from four forward and one reverse speed ranges. Table 1 below shows an example of the speed ranges which are established by engagement and release of the respective clutches, brakes and one-way clutches.

TABLE 1

| Ranges | | Solenoids | | | Clutches | | | Brakes | | | | OWC | | |
|---|---|---|---|---|---|---|---|---|---|---|---|---|---|---|
| | | $S_1$ | $S_2$ | $S_3$ | $C_0$ | $C_1$ | $C_3$ | $B_0$ | $B_1$ | $B_2$ | $B_3$ | $F_0$ | $F_1$ | $F_2$ |
| P | | O | X | X | E | X | X | X | X | X | X | f | f | f |
| R | | O | X | X | E | X | E | X | X | X | E | f | f | f |
| N | | O | X | X | E | X | X | X | X | X | X | f | f | f |
| D | 1 | O | X | X | E | E | X | X | X | X | X | (L) | f | L |
| | 2 | O | O | ◉ | E | E | X | X | X | E | X | (L) | L | f |
| | 3 | X | O | ◉ | E | E | E | X | X | E | X | (L) | f | f |
| | 4 | X | X | ◉ | X | E | E | E | X | E | X | f | f | f |
| S | 1 | O | X | X | E | E | X | X | X | X | X | (L) | f | L |
| | 2 | O | O | ◉ | E | E | X | X | E | E | X | (L) | (L) | f |
| | 3 | X | O | ◉ | E | E | E | X | X | E | X | (L) | f | f |
| | (3) | X | X | X | E | E | E | X | X | E | X | (L) | f | f |
| L | 1 | O | X | X | E | E | X | X | X | X | E | (L) | f | (L) |
| | 2 | O | O | X | E | E | X | X | E | E | X | (L) | (L) | f |
| | (1) | X | X | X | E | E | X | X | X | X | E | (L) | f | (L) |

In Table 1, "E" indicates the engaged state of the corresponding clutch or brake. The letter "L" indicates that the corresponding one-way clutch is engaged only in engine-drive condition and not in engine-brake condition. The bracketed letter "(L)" indicates the "locked" state where the corresponding one-way clutch is engaged in engine-drive condition although its engagement is not necessarily needed since the power transmission is guaranteed by a parallelly mounted clutch or brake. Further, the letter "f" indicates that the corresponding one-way clutch is free, and the cross "X" indicates that the corresponding clutch or brake is released. The letter "O" in the columns of S1 and S2 indicates ON state of the solenoid, and the cross "X" in the columns of S1, S2 and S3 indicates OFF state. The double circle " ◉ " in the column of S3 indicates that the lock-up clutch is ON when the solenoid is ON and that the lock-up clutch is OFF when the solenoid is OFF.

FIG. 4 is a hydraulic circuit diagram of the automatic transmission hydraulic control system 400 of FIG. 3, including: an oil strainer 410 fastened to the lower side of the hydraulic valve casing 403 in the oil pa 401 of FIG. 3; an oil pump 150; a cooler bypass valve 415; a pressure relief valve 416; a release clutch control valve 417; a release brake control valve 418; a lock-up relay valve 420; a pressure regulator valve 430; a second pressure regulator valve 450; a cutback valve 460; a lock-up control valve 470 for controlling the speed of pressure drainage in the drain conduit 6D from the lock-up relay valve 420 when the lock-up clutch 50 is released; a first accumulator control valve 480; a second accumulator control valve 490; a throttle valve 500; a manual valve 510 manually operated by a driver to switch the flows of oil pressure; automatically switching shift valves (a 1-2 shift valve 520, a 2-3 shift valve 530, a 3-4 shift valve 540); an intermediate coast modulator valve 545 for adjusting the oil pressure to be supplied to the brake B1; a low coast modulator valve 550 for adjusting the oil pressure to be supplied to the brake B3; an accumulator 560 for smoothening engagement of the clutch C0; an accumulator 570 for smoothening engagement of the brake B0; an accumulator 580 for smoothening engagement of the clutch C2; an accumulator 590 for smoothening engagement of the brake B2; flow control valves (orifices) 601 and 603 to 609 with check valves for controlling the flow rates of oil pressure to be supplied to the hydraulic servos of the clutches C0 and C2 and brakes B0 to B3; a shuttle valve 602; a first solenoid valve S1 opened and closed by an electronic circuit (a computer) to control the 2-3 shift valve 530; a second solenoid valve S2 which controls both of the 1-2 and 3-4 shift valves 520 and 540; a third solenoid valve S3 which controls both of the lock-up relay valve 420 and lock-up control valve 470; conduits connecting the respective valves with each other and with the hydraulic cylinders of the clutches and brakes; and throttles provided suitably in the conduits, including the throttle r1 provided in a drain conduit 6D in parallel relation with the lock-up control valve 470 for choking the oil flow from the lock-up relay valve 420 when the lock-up clutch 50 is released. Denoted at S are oil strainers provided between the respective conduits.

The operating oil which is drawn up through an oil strainer 410 by the oil pump 150 is fed to conduit 1 after regulating the oil pressure to a predetermined level (line pressure) by the pressure regulator valve 430. The excess pressure flowing into conduit 6, which is in fluid communication with conduit 1 through the pressure regulator valve 430, is regulated into a predetermined secondary line pressure (torque converter pressure) and into a lubricant oil pressure to be supplied to a lubricant conduit L1 of the transmission 300 and a lubricant conduit L2 of the extension housing 140. Part of the discharge oil from the oil pump is fed to an oil cooler O/C from conduit 1 or 6 through the lock-up relay valve 420 for cooling same.

The pressure regulator valve 430 includes a spool 432 which is loaded with a spring 431 on the upper side in the drawing, and a plunger 438 which is abutted in series against the spool 432. The spool 432 is displaced under the influence of downwardly acting forces, including the throttle pressure which is applied from above through conduit 9 on a land 436 at the upper end of the plunger 438, the spring load of the spring 431 and the line pressure which is applied on a land 437 at the lower end of the plunger 438 from conduit 5 when in the reverse position, and by upwardly acting forces of the feedback pressure which is applied on the land 433 at the lower end of the spool 432, thereby adjusting the area of communication of conduit 1 with conduit 6 and drain port 435 to produce line pressure in conduit 1 according to the operating conditions of the vehicle.

The manual valve 510 is connected to a shiftlever (or selector lever) which is provided besides the driver's seat for selection of the speed range, and movable to and from the positions of P (parking), R (reverse), N (neutral), D (drive) or S (second) or L (low) according to the range which is manually selected through the shiftlever. Table 2 below shows the states of conduits 2 to 5 which are in or out of fluid communication with conduit 1, in relation with the positions of the shiftlever. In this table, a circle "O" indicates that the corresponding conduit is in communication with conduit 1 and supplied with the line pressure, while a cross "X" indicates that the corresponding conduit is in fluid communication with the drain port of the manual valve.

TABLE 2

|  | P | R | N | D | S | L |
|---|---|---|---|---|---|---|
| Conduit 2 | X | X | X | O | O | O |
| Conduit 3 | X | X | X | X | O | O |
| Conduit 4 | X | X | X | X | X | O |
| Conduit 5 | X | O | X | X | X | X |

Turning now to the throttle valve 500, a cam 505 is rotated according to the extent of depression of the accelerator pedal, moving a throttle plunger 501 to displace a spool 502 through a spring 503 which is interposed between the plunger 501 and spool 502, thereby regulating the line pressure supplied from conduit 1 to produce in conduit 9 a throttle pressure commensurate with the extent of throttle opening.

The lock-up relay valve 420 has a spool 422 (the upper part in the drawing) and a plunger 424 (the lower part) disposed in series through a spring 426. The spool 422 is provided with an upper land 422A at its upper end in the drawing, an intermediate land 422B and a lower land 422C at its lower end in the drawing, and displaced by a downwardly acting force of solenoid pressure Ps in conduit 2D, which is in communication with conduit 2A through orifice r10 and provided with the solenoid valve S3, and by an upwardly acting force of the spring 426. When the solenoid pressure Ps is lower than a predetermined value, the spool 422 is held in the upper position in the drawing by the overcoming action of the spring 426, communicating conduit 6, which is a pressure source of the torque converter 200, with a lock-up clutch releasing oil conduit 6A, and, in the case of the particular embodiment shown, communicating drain conduit 6C, which is an oil cooler lubricant conduit, with a lock-up clutch engaging oil conduit 6B. As a result, the pressure of the clutch releasing face 50B of the clutch disk 50 becomes higher than that of its clutch releasing face 50A, and the clutch disk 50 is pressed against the friction surface 20 to engage the lock-up clutch 20. In this instance, since the solenoid valve S3 is under duty control, the solenoid pressure in conduit 2D can be precisely controlled according to the vehicle speed, throttle opening or other operating conditions of the vehicle and it can be varied in a smooth manner to engage or release the lock-up clutch smoothly through a slipping state.

The lock-up control valve 470 includes a spool 472 (the upper part in the drawing) and a plunger 474 (the upper part in the drawing) of a larger diameter, which are disposed in series, and a spring 476 loaded at the lower end of the spool 472. The spool 472 and plunger 474 are displaced by the downwardly acting force of the solenoid pressure Ps in conduit 2D which is applied to an oil chamber 471 at the upper end of a land 474A of a large diameter, and by upwardly acting forces including the load of the spring 476 which is imposed on the spool 472, the line pressure (related with the throttle pressure) which is fed to the lower oil chamber 477 from conduit 1 and applied to the land 478 at the lower end of the spool 472, and the oil pressure in the drain conduit 6D which is supplied to an intermediate oil chamber 475 between the spool 472 and plunger 474 through a throttle r2.

If the drain conduit 6D is communicated with conduit 6A, the spool 472 is displaced by the oil pressure applied to the upper end land 479 from conduit 6D and the load of the spring 476 when the solenoid pressure is lower than a predetermined value. When the solenoid pressure Ps is higher than the predetermined value, it is displaced by the solenoid pressure Ps and the load of the spring 476, thereby adjusting the degree of communication between a normally open port 47a, which is in communication with conduit 6D, and the drain port 47D to adjust the oil drain speed (relief control) through the drain port 47D. This pressure drainage continues until the clutch disk 50 of the lock-up clutch contacts the friction surface 20. Consequently, the engagement of the lock-up clutch 80 is initiated more speedily. After the contact, the pressure in conduit 6D is drained gradually through a throttle r1 provided parallel with the lock-up control valve 470 which is a relief control valve, smoothly increasing the lock-up clutch capacity. The drainage of pressure through the drain port 47b is effected according to the duty ratio of the solenoid valve S3 depending upon the vehicle speed, throttle opening or other operating conditions of the vehicle, gradually dropping the pressure on the clutch releasing face 50A of the clutch disk 50 to engage the lock-up clutch 80 smoothly for suppressing shift shocks in a wide range of operating conditions of the vehicle. Further, a port 47c which is in communication with conduit 6 is provided above an inlet port 47a in the drawing. When the spool 472 is in the upper position in the drawing, conduits 6D and 6 are communicated with each other, and the drain port 47b is closed. When the spool 472 is in the lower position in the drawing, the port 47c is closed, communicating conduit 47a with the drain port 47b. When the spool 472 is in an intermediate position, the extent of open areas of the port 47c and drain port 47b are adjusted by the position of the spool 472. Consequently, the speed of pressure drainage through conduit 6D can be controlled without entailing pressure drops in the torque converter, improving the effect of preventing cavitation in the torque converter. In this instance, as the solenoid pressure in conduit 2D is fluctuated by the duty control of the solenoid valve S3, it is desirable to insert a relatively strong hydraulic fluctuation attenuator such as a throttle or a capacitor in a position near the inlet port of the upper oil chamber 471. In addition, for the purpose of preventing wobbling movements of the spool 472, it is recommended to provide throttles or other attenuators at the inlet and outlet ports of the lock-up control valve 470.

In the particular embodiment shown, the line pressure Pl in conduit 1 which represents the oil pressure Pi, varying mainly in relation with the vehicle speed, is drawn into the lower oil chamber 477 in which the spring 476 is loaded, thereby correlating the timing of initiating engagement of the lock-up clutch and the rise of the transmission torque capacity with the operating conditions of the vehicle, this makes it possible to control the engagement of the lock-up clutch in an optimum manner in a wide range of the vehicle operating conditions.

When in de-energized state, the first solenoid valve S1 produces a solenoid pressure of high level (equivalent to the line pressure) in conduit 2G which is in communication with conduit 2 through throttle r11, and, when in engerized state, it produces a solenoid pressure of low level by draining the oil pressure in conduit 2G.

The second solenoid valve S2, when in deenergized state, produces a solenoid pressure of high level in conduit 1H which is in communication with conduit 1 through throttle r12, and, when in energized state, it produces a solenoid pressure of low level by draining the oil pressure in conduit 1H.

The third solenoid valve S3 which is under duty control as mentioned hereinbefore controls the oil pressures in the upper oil chamber 421 of the lock-up relay valve 420, in communication with conduit 2D which is in turn in communication with conduit 2 through throttle r10, and in the upper oil chamber 471 of the lock-up control valve 470.

Table 1, given above, shows energization "O" and de-energization "X" of the solenoid valves S1 and S2 under control of the electronic circuit, in relation with the shift positions of the shiftlever and speed ranges of the automatic transmission.

The 1-2 shift valve 520 is provided with a spool 522 which is loaded with a spring 521 at the lower end in the drawing, and receives the solenoid pressure of high level in the upper oil chamber 524 when the solenoid valve S2 is de-energized (OFF) and the high level solenoid pressure prevails in conduit 1H, holding the spool 522 in the lower position in the drawing, i.e., the first speed position. When the solenoid valve S2 is energized (ON) and the oil pressure in conduit 1H is drained into low level, the spool 522 is held in the upper position in the drawing, i.e., the second speed position. In the third and fourth speeds, the line pressure is introduced into the lower oil chamber 523 from conduit 1C, which is in communication with conduit 1B through conduit 1 and 2-3 shift valve 530, fixing the spool 522 in the upper position irrespective of the solenoid pressure level.

The 2-3 shift valve 530 is provided with a spool 532, which is loaded with a spring 531 at the lower end in the drawing and held in the upper position for the first and second speeds when the solenoid valve S1 is energized and the solenoid pressure of low level prevails in conduit 2G. When the solenoid valve S1 is de-energized, the high level solenoid pressure which prevails in conduit 2G is applied to the oil chamber 534, setting the spool 532 in the lower position in the drawing, i.e., the position for the third and fourth speeds. When the line pressure is supplied to conduit 4, it is introduced into the oil chamber 533 to lock the spool 532 in the upper position in the drawing or the position for the first and second speeds.

The 3-4 shift valve 540 is provided with a spool 542, which is loaded with a spring 541 at the lower end in the drawing and locked in the upper position (for the third speed) in the drawing irrespective of the solenoid pressure level in the first and second speeds where the line pressure is supplied to the lower oil chamber 544 through conduit 1, 2-3 shift valve 530 and conduit 1E. In the second and third speed where the solenoid valve S2 is energized and conduit 1H is drained to low level, the spool 542 is held in the upper position in the drawing. In the fourth speed where the solenoid valve S2 is deenergized, the high level solenoid pressure which prevails in conduit 1H is applied to the upper oil chamber 543 to hold the spool 542 in the lower position in the drawing.

The cutback valve 460 is provided with a spool 466 which is displaced by the load of a spring 461 acting from above in the drawing and by the line pressure in conduit 2A. When the line pressure is supplied to conduit 2A, the spool 462 is set in the upper position in the drawing to send the throttle pressure in conduit 9 to a cutback pressure output conduit 9A, thereby producing the throttle pressure as cutback pressure. This cutback pressure is applied to the land 507 of the spool 502 of the throttle valve 500 to lower the level of the throttle pressure prevailing in conduit 9. By this drop of the throttle pressure, the spool 432 of the regulator valve 430 which receives the throttle pressure as its input is displaced to the upper position in the drawing to lower the level of the line pressure in conduit 1, namely, to effect the so-called cutback of the line pressure.

The first accumulator control valve 480 is provided with a spool 481 above a plunger 483 of a larger diameter which is disposed in series with the spool 481 and loaded with a spring 482, the plunger 483 having the outer peripheral portion of its lower end on the side of the spool formed in a cylindrical shape and projected (downward in the drawing) in such a manner as to contain the inner peripheral portion of the upper end of the plunger. The spool 481 is displaced under the influence of the upwardly acting force of the line pressure which is admitted into the lower oil chamber 484 through conduit 1 and by the downwardly acting forces consisting of the load of the spring 482 and the feedback oil pressure which is applied to the upper oil chamber 485 from conduit 1M through a throttle r13, adjusting the line pressure from conduit 1 to produce output oil pressure P1 in conduit 1M.

The second accumulator control valve 490 is provided with a spool 492 which is loaded with a spring 491 at the lower end in the drawing and formed with an oil hole 494 with a throttle r14 in its upper land 493 to communicate an upper oil chamber 495 with an intermediate oil chamber 496. The spool 492 is displaced by the upwardly acting forces consisting of the load of the spring 491 and the throttle pressure Pth which is applied to the lower land 497 of a large diameter from conduit 9, and by the downwardly acting force of the feedback output oil pressure (accumulator control pressure Pa) which is applied to an upper land 493 through conduit 1M and throttle r14, thereby adjusting the output pressure of the first accumulator control valve from conduit 1M to produce accumulator control pressure Pa in conduit 1Q.

The operations of the hydraulic control system in the respective shift positions of the manual valve 510 are as follows.

When the manual valve 510 is shifted to N-range position:

As shown in Table 2, conduit 1 is not in communication with any one of conduits 2 to 5, and, as shown in Table 1, the solenoid valves S1 and S2 are energized and de-energized, respectively. Therefore, the spools 522 and 542 of the 1-3 shift valve 520 and 3-4 shift valve 540 are held in the lower positions in the drawing by the high level solenoid pressure in conduit 1H, and the spool of the 2-3 shift valve is held in the upper position in the drawing by the action of the spring, engaging only the clutch C0 which is in communication with conduit 1 directly through the 3-4 shift valve 540, conduit 1F and flow control valve 601 with a check valve, without passing through the manual valve 510.

When the manual valve 510 is shifted to D-range position:

As shown in Table 2, the line pressure is supplied to conduit 2 to engage the clutch C1.

When starting a vehicle, the solenoid valve S1 is energized and the solenoid valve S2 is de-energized as shown in Table 1, holding the spool 522 of the 1-2 shift valve in the lower position in the drawing, since conduit 3B and 2A to the brakes B1 and B2 are drained and conduit 5C to the brake B3 is not supplied with oil pressure, all of the brakes B1 to B3 are released, assuming the first speed position. In automatic shift operation, the solenoid valve S2 is energized in response to an output signal of the computer as shown in Table 1 as soon as the vehicle speed reaches a predetermined value, turning to low level the solenoid pressure which is being supplied to the oil chamber 524 of the 1-2 shift valve. As a result, the spool 522 of the 1-2 shift valve 520 is moved into the upper position in the drawing, supplying the oil pressure through conduit 2, 1-2 shift valve 520, conduit 2A and flow control valve 608 with a check valve and engaging the brake B2 for an upshift to the second speed.

An upshift to the third speed takes place when the vehicle speed or throttle opening reaches a predetermined value, de-energizing the solenoid valve S1 by an output signal of the computer and moving the spool 532 of the 2-3 shift valve 530 to the lower position in the drawing. Now, the oil pressure is supplied through conduit 1, 2-3 shift valve 530, conduit 1B, shuttle valve 602, flow control valve 603 with a check valve and conduit 1P to engage the clutch C2. At the same time, the spool 522 of the 1-2 shift valve 520 is held in the upper position in the drawing (the second speed position) by the line pressure which is supplied to the lower oil chamber 523 from conduit 1C.

An upshift to the fourth speed takes places similarly in response to an output signal from the computer, de-energizing the solenoid valve S2 to turn to high level the solenoid pressure which is being supplied to the lower oil chamber 543 of the 3-4 shift valve 540 from conduit 1H, displacing the spool 542 of the 3-4 shift valve 540 to the lower position in the drawing. As a result, conduit 1F is drained and conduit 1P is supplied with the oil pressure, sending the oil pressure to 1L through the flow control valve 605 with a check valve to release the clutch C0 while engaging the brake B0.

When the manual valve 510 is in S-range position:

In addition to conduit 2, the line pressure is supplied to conduit 3. The shifts to the first, second and third speeds are effected in the same manner as in D-range described above, but the line pressure is fed to the lower oil chamber 544 of the 3-4shift valve 540 through conduits 3 and 1E, fixing the spool 542 in the upper position in the drawing to prohibit a shift to the fourth speed.

Further, in the second speed, the line pressure is fed to conduits 2A and 2D through the 1-2 shift valve 520 in the same manner as in the above-described second speed of D-range. The line pressure is also supplied to conduit 3B from conduit 3 to conduit 3B through the 2-3 shift valve 530, conduit 3A and 1-2 shift valve 520, and thus to conduit 3C to establish the second speed in which the brakes B2 and B1 are always engaged. In the second speed of S-range, the engine brake is workable in coasting operation, and the transmission torque capacity increases.

If a D-S shift is manually made during operation in the forth speed with the manual valve 510 in D-position, the downshift to the third speed is effected immediately by the line pressure which is drawn into the lower oil chamber 544 of the 3-4 shift valve 540 as described hereinbefore, energizing the solenoid valve S1 for 3-2 shift in response to an output signal of the computer upon deceleration to a predetermined speed thereby establishing the second speed where the engine brake is workable.

When the manual valve 510 is in the position of L-range:

In addition to conduits 2 and 3, the line pressure is supplied to conduit 4. The shifts to the first and second speeds are effected in the same manner as described hereinbefore, but there occurs no shift to the third speed since the spool 532 of the 2-3 shift valve is fixed in the upper position in the drawing by the line pressure which is admitted into the lower oil chamber 533 from conduit 4. In the first speed, the brake B3 is engaged by the oil pressure which is supplied through conduit 4, 2-3 shift valve 530, conduit 4A, low coast modulator valve 550, conduit 4B, 1-2 shift valve 520 and conduit 5C to make the engine brake workable. The operation in the second speed is same as when the manual valve 510 is shifted to the S-range position. If a shift to L-range is manually made during operation in the third speed, a downshift to the second speed is effected immediately by the line pressure which is admitted into the lower oil chamber 533 of the 2-3 shift valve 530, and a 2-1 downshift is effected by deenergizing the solenoid valve in response to an output signal of the computer at a time point of deceleration to a predetermined speed.

When the manual valve 510 in the position of R-range:

As shown in Table 2, the oil pressure is supplied to conduit 5, supplying the line pressure through the shuttle valve 602, flow control valve 603 and conduit 1P to engage the clutch C2. Since the solenoid valve S1 is on, the solenoid pressure which prevails in the upper oil chamber 534 of the solenoid valve S1 is at low level and the spool 532 is held in the upper position in the drawing, supplying the line pressure from conduit 1 to 1E to the lower oil chamber 544 of the 3-4 shift valve 540, holding the spool 542 in the upper position regardless of ON and OFF of the solenoid valve and supplying the line pressure from conduit 1 to 1F to engage the clutch C0. Further, as the 1-2 shift valve 520 is supplied with the line pressure in its lower oil chamber 523 through conduit 1C, the spool 522 is held in the upper position in the drawing irrespective of ON and OFF of the solenoid valve S2, supplying the line pressure to conduit 5C to engage the brake B3.

When the manual valve 510 is shifted to D- or S-range and the line pressure prevails in conduit 2, with the 1-2 shift valve held in the second speed position (in the upper position in the drawing), the line pressure appears in conduit 2D to perform the above-described lock-up clutch control.

Since the first and second accumulator control valves are provided in a sleeve form as in the foregoing embodiments, it is possible to use the same transmission cases and accumulators commonly on motor vehicles of various types.

What is claimed is:

1. A hydraulic control system for a vehicular automatic transmission comprising:
   an oil source,
   a hydraulic servo of friction coupling element for selectively engaging to change shifts, and
   an accumulator control circuit provided between the oil source and the hydraulic servo, said accumulator control circuit having
      a line pressure conduit connected between the oil source and the hydraulic servo,
      an accumulator provided in the line pressure conduit to accumulate a hydraulic pressure to the hydraulic servo,
      a back pressure supply conduit connected between the oil source and the accumulator, and
   first and second accumulator control valves provided in the back pressure supply conduit,
      said first accumulator control valve, connected between the oil source and a first output conduit leading to the second accumulator control valve, including a first spool, a first spring biasing the first spool, a lower oil chamber in which a line pressure is supplied to bias the first spool against the force of the first spring and an upper land on which a line pressure is supplied via the first output conduit to bias the first spool for the force of the first spring,
      said second accumulator control valve, connected between the first output conduit and a second output conduit leading to the accumulator, including a second spool, a second spring biasing the second spool, a lower land on which a throttle pressure according to an engine output shaft torque is supplied to bias the second spool for the force of the second spring, and an upper oil chamber connected to the first output conduit, in which a fluid pressure via the first output conduit is supplied to bias the second spool against the force of the second spring.

* * * * *

UNITED STATES PATENT AND TRADEMARK OFFICE
CERTIFICATE OF CORRECTION

PATENT NO. : 4,854,195

DATED : August 8, 1989

INVENTOR(S) : MOROTO et al

It is certified that error appears in the above-identified patent and that said Letters Patent is hereby corrected as shown below:

ON THE FACE OF THE PATENT:

"Assignee: Aisin-Warner Limited, Japan" should read

--Assignee: Aisin-Warner Limited and Toyota Jidosha Kabushiki Kaisha, both of Japan--.

Signed and Sealed this

Twenty-ninth Day of January, 1991

*Attest:*

HARRY F. MANBECK, JR.

*Attesting Officer*     *Commissioner of Patents and Trademarks*